US012392188B2

(12) United States Patent
Vanini et al.

(10) Patent No.: US 12,392,188 B2
(45) Date of Patent: Aug. 19, 2025

(54) HINGE FOR DOORS OF ELECTRICAL HOUSEHOLD APPLIANCES

(71) Applicant: NUOVA STAR S.p.A., Zola Predosa (IT)

(72) Inventors: Marco Vanini, Zola Predosa (IT); Luca Vanini, Zola Predosa (IT)

(73) Assignee: NUOVA STAR S.P.A., Zola Predosa (IT)

( * ) Notice: Subject to any disclaimer, the term of this patent is extended or adjusted under 35 U.S.C. 154(b) by 0 days.

(21) Appl. No.: 18/155,165

(22) Filed: Jan. 17, 2023

(65) Prior Publication Data

US 2023/0228140 A1 Jul. 20, 2023

(30) Foreign Application Priority Data

Jan. 18, 2022 (IT) ........................ 102022000000716

(51) Int. Cl.
*E05F 1/12* (2006.01)
*A47L 15/42* (2006.01)

(52) U.S. Cl.
CPC ........ *E05F 1/1261* (2013.01); *A47L 15/4261* (2013.01); *E05F 1/1276* (2013.01)

(58) Field of Classification Search
CPC ..... E05F 1/1246; E05F 1/1253; E05F 1/1261; E05F 1/1269; E05F 1/1276; A47L 15/4261; F24C 15/023
USPC ................. 16/281, 286, 287, 288, 289, 291; 312/349, 350
See application file for complete search history.

(56) References Cited

U.S. PATENT DOCUMENTS 1,180,307 A * 4/1916 Malone et al. ........... E05D 7/04 16/281
3,183,550 A * 5/1965 Phelps ................... A45C 13/34 217/60 E
3,187,374 A * 6/1965 Lundell ................. E05F 1/1261 217/60 R
3,744,869 A * 7/1973 Anderson ............ A47B 88/427 312/348.1
5,020,189 A * 6/1991 Grome .................. E05F 1/1253 16/72

(Continued)

FOREIGN PATENT DOCUMENTS

DE 102010040952 A1 3/2012
EP 1431671 A1 * 6/2004 ......... A47L 15/4261

(Continued)

OTHER PUBLICATIONS

Italian Search Report dated Sep. 5, 2022 from counterpart Italian Patent Application No. 102022000000716.

*Primary Examiner* — Jeffrey O'Brien
(74) *Attorney, Agent, or Firm* — SHUTTLEWORTH & INGERSOLL, PLC; Timothy J. Klima

(57) ABSTRACT

Described is a hinge for doors of electrical household appliances, including a first element and a second element pivoted to each other and movable relative to each other in tilting fashion, the first and second elements being fixable one to a frame and the other to a door of an electrical household appliance, for making the door movable with respect to the frame between a closed position and an open position, a lever for connection between the first and the second closing elements, the lever being pivoted on the first element, an elastic element operatively connected to the lever to oppose the weight force of the door during its opening.

9 Claims, 10 Drawing Sheets

(56) References Cited

U.S. PATENT DOCUMENTS

| | | | | |
|---|---|---|---|---|
| 5,904,411 A * | 5/1999 | Hayakawa | E05D 15/582 | 49/386 |
| 6,845,545 B2 * | 1/2005 | Han | E05F 1/14 | 312/319.2 |
| 7,178,202 B2 * | 2/2007 | Hirtsiefer | E05D 15/46 | 16/366 |
| 7,192,105 B2 * | 3/2007 | Jung | F25D 23/028 | 312/405 |
| 7,243,396 B2 * | 7/2007 | Vanini | E05F 1/1058 | 16/286 |
| 7,478,891 B2 * | 1/2009 | Hollenstein | E05F 3/106 | 312/328 |
| 7,610,656 B2 * | 11/2009 | Vanini | E05F 1/1261 | 16/286 |
| 7,676,888 B2 * | 3/2010 | Vanini | F24C 15/023 | 16/277 |
| 7,748,080 B2 * | 7/2010 | Hottmann | E05F 1/1253 | 16/72 |
| 8,307,504 B2 * | 11/2012 | Collene | E05D 7/12 | 16/286 |
| 8,474,103 B2 * | 7/2013 | Lee | E05D 15/582 | 16/370 |
| 8,495,794 B2 * | 7/2013 | Peng | H04M 1/0227 | 16/293 |
| 9,995,075 B2 * | 6/2018 | Vanini | E05F 1/1246 | |
| 10,244,920 B2 * | 4/2019 | Vanini | E05D 3/14 | |
| 10,794,102 B2 * | 10/2020 | Vanini | E05F 1/12 | |
| 11,697,955 B2 * | 7/2023 | Vanini | E05F 1/1261 | 16/277 |
| 2008/0238276 A1 * | 10/2008 | Migli | E05F 15/614 | 16/277 |
| 2011/0247176 A1 * | 10/2011 | Vanini | E05F 5/00 | 16/297 |
| 2014/0150212 A1 * | 6/2014 | Collene | E05F 5/02 | 16/221 |
| 2014/0215761 A1 * | 8/2014 | Zetti | E05F 1/1261 | 16/288 |
| 2015/0152675 A1 * | 6/2015 | Vanini | A47B 96/00 | 16/288 |
| 2018/0073291 A1 * | 3/2018 | Vanini | E05F 3/20 | |

FOREIGN PATENT DOCUMENTS

| | | | | |
|---|---|---|---|---|
| EP | 1764557 A2 | | 3/2007 | |
| EP | 2128369 A2 | * | 12/2009 | E05F 1/1276 |
| EP | 2298983 A1 | * | 3/2011 | A47L 15/4261 |
| EP | 2295692 B1 | * | 9/2012 | E05F 1/1261 |
| EP | 2912984 A1 | * | 9/2015 | A47L 15/4261 |
| EP | 3056644 B1 | | 1/2018 | |

* cited by examiner

HINGE FOR DOORS OF ELECTRICAL HOUSEHOLD APPLIANCES

This application claims priority to Italian Patent Application 102022000000716 filed Jan. 18, 2022, the entirety of which is incorporated by reference herein.

This invention relates to a hinge for doors of electrical household appliances.

In particular, the invention relates to a hinge for doors of dishwashers.

In the field of electrical household appliances, and therefore also for dishwashers, there has been a race over recent years towards the reduction of production costs, so as to be able to offer products on the market with increasingly higher performance levels at competitive prices.

Whilst, on the one hand, the development of electronics has made it possible to achieve, also in the field of electrical household appliances, functions and performance levels which until not long ago were inconceivable, in the field of mechanical components, on the other hand, attempts have been made to optimise the construction elements, making them more economical, and more practical to assemble and install in electrical household appliances.

Such an effort for optimisation has also concerned the sector of the hinges. Attempts have therefore made to produce the hinges at lower costs, but also to make them more effective in terms of performance or practicality with regard to their assembly on the electrical household appliance or the related adjustments.

In fact, the existing hinges have not always been simple and inexpensive to produce, also being sometimes bulky and complex, both during construction and assembly.

The aim of the invention is to provide a hinge for optimised electrical household appliances, which is at the same time effective but also simple and inexpensive to make and practical to install.

According to the invention, these aims and others are achieved by a hinge for electrical household appliances comprising the technical features described in the accompanying claims.

The technical features of the invention, according to the above-mentioned aims, are clearly described in the appended claims and its advantages are apparent from the detailed description which follows, with reference to the accompanying drawings which illustrate non-limiting example embodiments of it, and in which:

Figure 1:
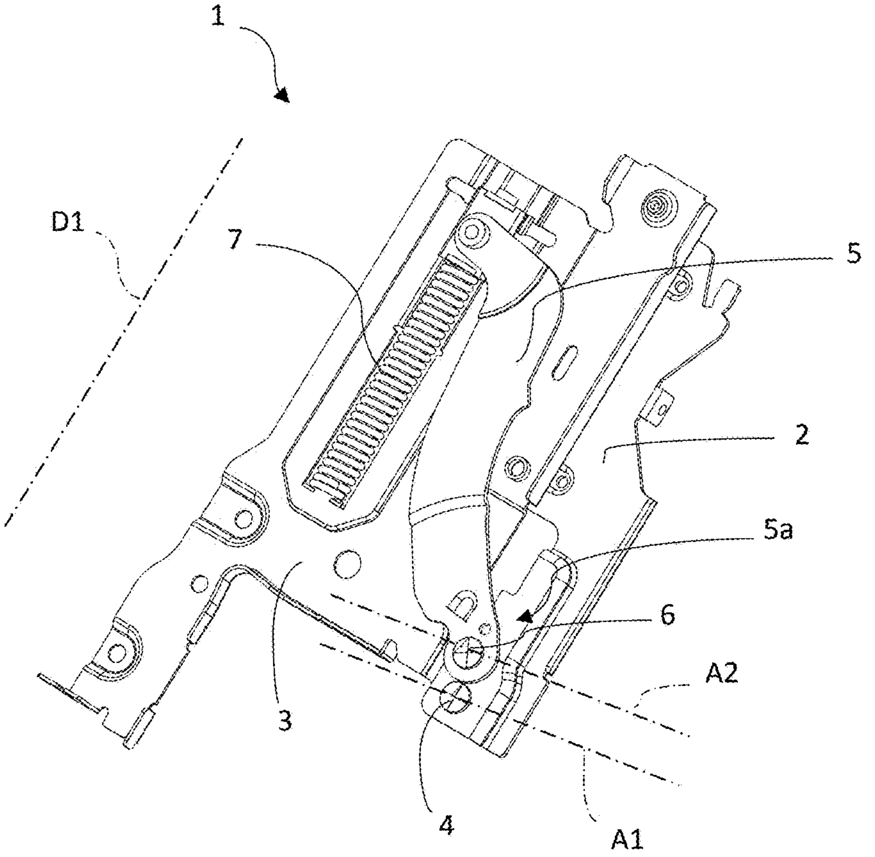
FIGS. 1 and 2 are respective schematic perspective views of a first embodiment of the hinge for electrical household appliances according to the invention in two different configurations of use.
Figure 2:
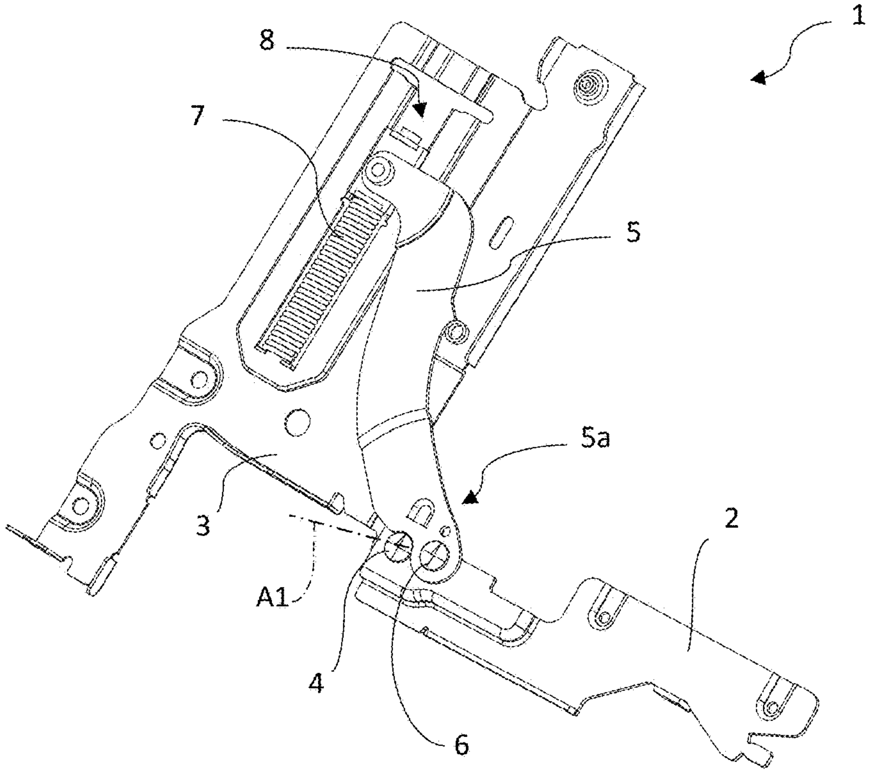

With reference to FIGS. 1 and 2, the reference numeral 1 denotes in its entirety a first embodiment of the hinge according to the invention.

The hinge 1 is advantageously intended to be mounted, in pairs, on a dishwasher, not illustrated, to connect the frame to a door in such a way that the latter is movable in a tilting fashion relative to the frame and, in other words, make the door movable with respect to the frame between a closed position, as shown in FIG. 1, and an open position, as shown in FIG. 2.

With reference to the accompanying drawings, the hinge 1 comprises a first element 2 designed to be fixed to the above-mentioned, not illustrated, door of the dishwasher, and a second element 3 designed to be fixed to the above-mentioned, not illustrated, frame of the dishwasher.

The above-mentioned first and second elements 2 and 3 are kinematically connected to each other by a connecting lever 5.

The first and second elements 2, 3 are advantageously made by die forming from sheet metal.

At a first end of it 5*a*, the connecting lever 5 is pivoted to the first element 2 by a pin 6 in such a way as to rotate at least partly relative to the first element 2 itself about a respective axis A2.

The hinge 1 also comprises an elastic element 7 operatively connected to the lever 5 to oppose the weight force of the door during opening of the door.

The elastic element 7 applies a balancing action on the above-mentioned and not illustrated door of the electrical household appliance.

According to the embodiment of the hinge 1 illustrated in FIGS. 1 and 2, the elastic element 7 comprises a helical spring acting by compression.

In other words, it is a helical spring configured to apply its elastic reaction force following a reduction, by compression, of its longitudinal extension.

Figure 13:
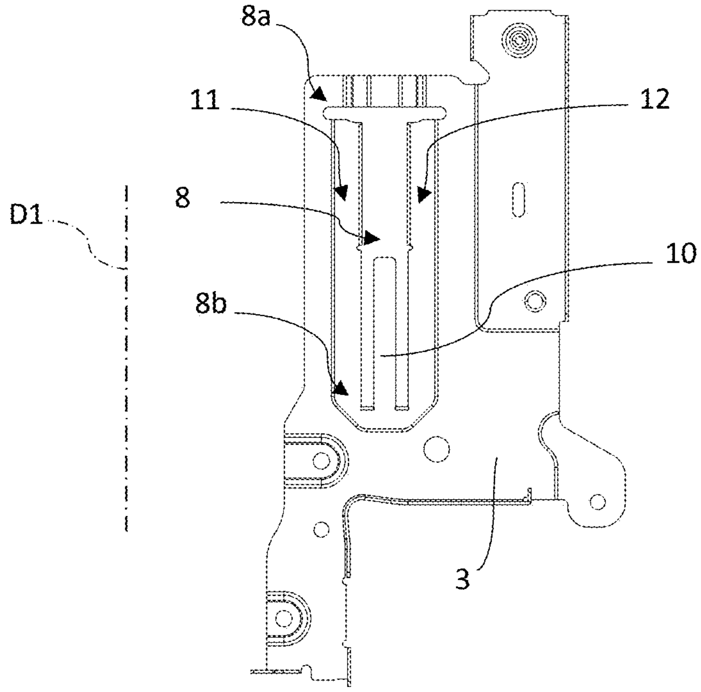
FIG. 13 is a schematic front elevation view of a disassembled detail of the hinge of FIGS. 1 and 2.

As clearly illustrated in FIG. 13, a slot 8 for housing the elastic element 7 is made on the second element 3.

The slot 8 is defined by a gap in the metal sheet which constitutes the second element 3 and is advantageously formed during moulding of the second element 3, by means of a suitable punch.

In other words, the gap defining the slot 8 is obtained by punching the sheet.

The punching operation is performed with a press, with the use of a mould consisting of a punch and a die and consisting in stressing a metal sheet until generating a fracture which delimits the desired shape of the slot 8.

In practice, the punch penetrates into the sheet, passing through the die and removing a predetermined portion corresponding to the shape of the slot 8.

Advantageously, the making of the slot 8 in the form of a gap in the material determines an overall lightening of the hinge 1.

Again with reference to FIG. 13, the slot 8 extends mainly along a predetermined direction D1 and has an upper end 8*a* and a longitudinally opposite lower end 8*b*.

The hinge 1 comprises a slider 9 movable inside the slot 8 and operatively connected both to the elastic element 7 and to the connecting lever 5.

At the lower end 8*b* of the slot 8, a fin 10 is formed on the second element 3 protruding inside the slot 8 and extending according to the above-mentioned predetermined direction D1. The fin 10 is designed to be inserted inside the above-mentioned helical spring defining the elastic element 7, for guiding the movement of the turns of the helical spring, avoiding its possible bending during compression.

The above-mentioned slider 9 and fin 10 define, for the hinge 1 according to the invention, means 14 for containing and guiding the elastic element 7, configured for guiding the extension/compression movement of the elastic element 7 along the slot 8.

At its upper end 8*a*, the slot 8 is wider to allow the slider 9 to be inserted along the slot 8.

Figure 9:
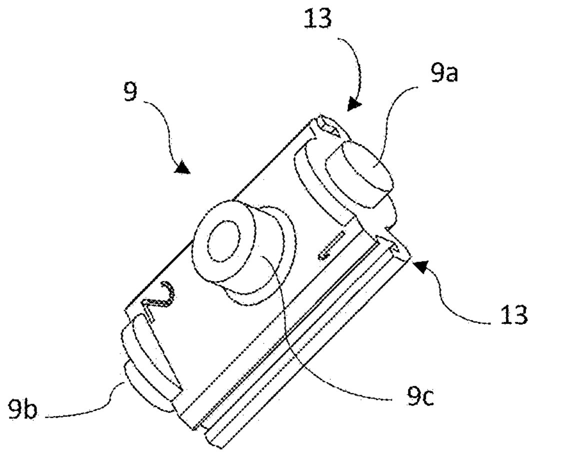
FIG. 9 is a schematic perspective view of a detail of the hinge of FIGS. 1 and 2.
Figure 10:
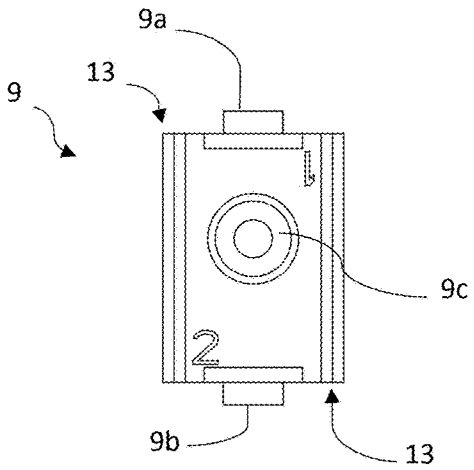
FIG. 10 is a schematic front elevation view of the detail of FIG. 9.
Figure 11:
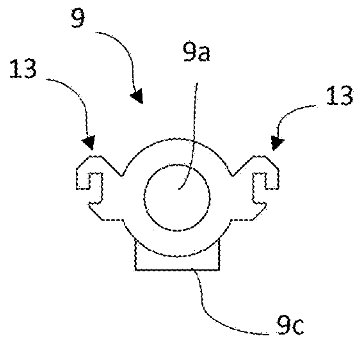
FIG. 11 is a plan view of the detail of FIGS. 9 and 10.

As illustrated in detail in FIGS. 9 to 11, the slider 9 has two longitudinally opposite end portions 9*a*, 9*b*, each designed to engage alternatively with the above-mentioned elastic element 7.

Advantageously, as illustrated in FIGS. 9 to 11, the two above-mentioned end portions 9*a*, 9*b* of the slider 9 are made in a cylindrical shape to be inserted inside the upper end turns of the helical spring defining the elastic element 7, as illustrated in FIGS. 1 and 2.

The slider 9 also comprises a fulcrum element 9*c* interposed between the two above-mentioned end portions 9*a*, 9*b* to engage with the connecting lever 5.

Advantageously, according to the embodiment illustrated, the fulcrum element 9*c* is positioned in an off-centre position relative to the two above-mentioned end portions 9*a*, 9*b*, so as to determine two possible configurations of assembly of the hinge 1, each defining a different preloading condition of the elastic element 7.

Figure 12:
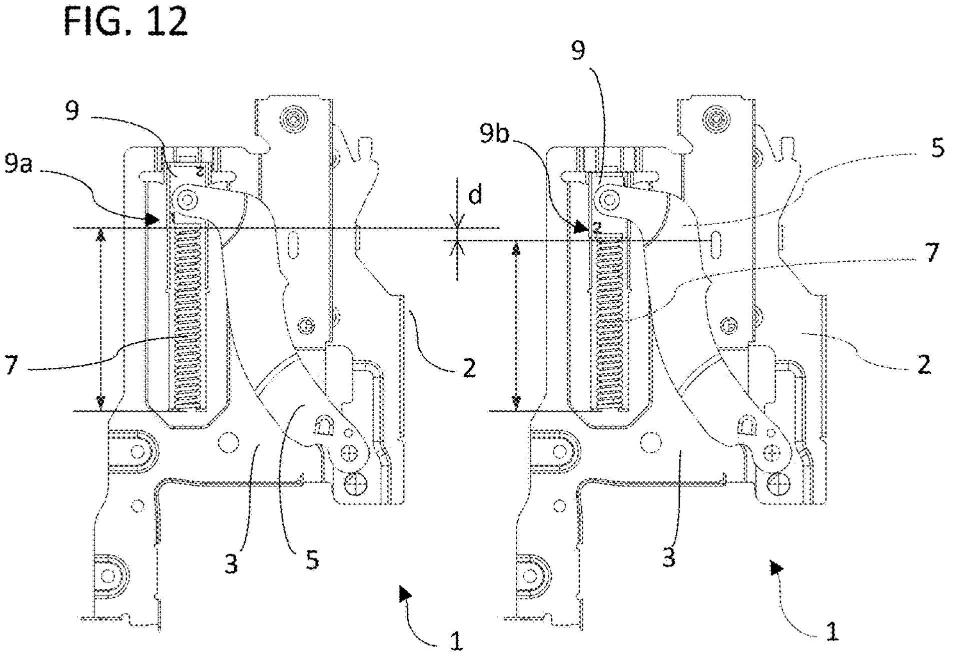
FIG. 12 is a schematic front elevation view in which two different configurations of the hinge of FIGS. 1 and 2 are side by side.

In other words, for example with reference to FIG. 12, which shows a hinge of the type shown in FIG. 1 comprising a helical spring of the compression type, the connection to the upper end turns of the helical spring of one or the other of the two end portions 9*a*, 9*b* of the slider is such that, under equal conditions of position of the connecting lever 5 (on which the slider 9 is pivoted), the helical spring is more or less compressed and this determines different operating conditions of the elastic element 7 with respect to the door of the electrical household appliance. More in detail, in the left hinge, in which it is the end portion 9*a* which is in contact with the upper turns of the helical spring, there is a pre-compression of the spring which is less than that of the right hinge in which it is the end portion 9*b* which has been engaged with the upper turns of the helical spring.

The distance "d" illustrated in FIG. 12 represents how much more compressed the spring of the right-hand hinge is with respect to the one on the left.

This opportunity is advantageously exploited during assembly of the hinge 1, for example to prepare the hinge 1 for use with doors of different weights.

Figure 14:
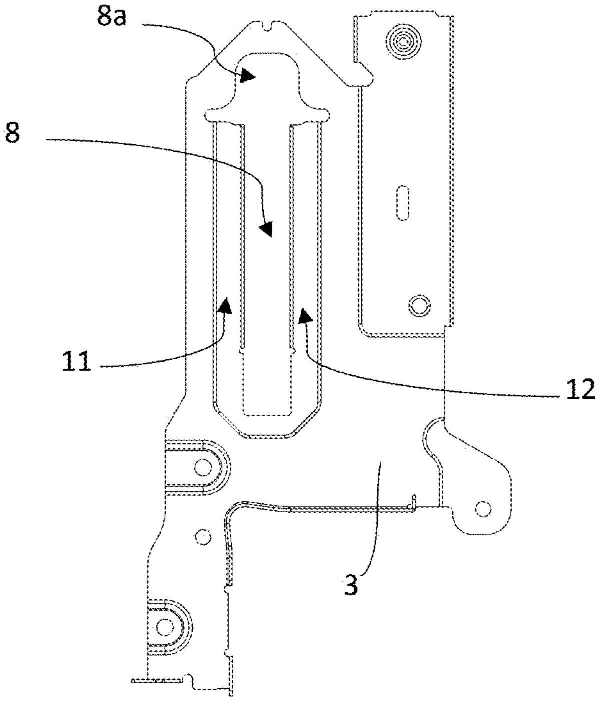
FIG. 14 is a schematic front elevation view of a disassembled detail of the hinge of FIGS. 3 and 4.

As illustrated in the accompanying drawings, and in particular in FIGS. 13 and 14, the slot 8 has two longitudinal edges 11, 12 facing each other on the edges 11, 12 of which the slider 9 slidably engages.

The longitudinal edges 11, 12 are defined by the sharp edges obtained by the above-mentioned punching of the metal sheet of the second element 3.

Advantageously, therefore, the guide of the slider 9 is formed by the above-mentioned longitudinal edges 11, 12 obtained by the punching, without the need for further bending of the sheet, thereby simplifying the production steps of the hinge 1.

Each of the above-mentioned longitudinal edges 11, 12 facing each other has two respective opposite faces respectively coplanar with the respective opposite faces of the other edge 12, 11.

The slider 9 has two respective lateral portions 13 for engaging with at least two respective above-mentioned coplanar faces of the longitudinal edges 11, 12 facing each other, the lateral portions 13 being configured to slide with friction on the coplanar faces and give rise to an action for damping the movement of the elastic element 7 and of the connecting lever 5.

Advantageously, as illustrated in FIG. 11, the above-mentioned lateral portions 13 for engaging the slider 9 are C-shaped.

Further, the above-mentioned opposite longitudinal edges 11, 12 have respective longitudinal edges folded squarely to slidably engage inside the above-mentioned C-shaped lateral portions 13 of the slider 9.

This particular "C" shape advantageously allows the slider 9 to apply its damping action on the above-mentioned coplanar faces of the edges 11, 12, that is to say, on a substantially flat and smooth surface like that of the metal sheet from which the second element 3 is normally made.

Thanks to this shape, the sliding of the slider in close contact with the sharp edge of the metal sheet (plate from which the second element 3 is made by die forming) is therefore avoided at its longitudinal edges 11, 12. In fact, if the slot 8 is made advantageously, as mentioned, by means of a punching step, the edges 11, 12 might be (after punching) sharp and/or in any case not smooth and, therefore, not be suitable for sliding in contact with the slider 9. Thanks to the above-mentioned C-shaped lateral portions 13, the slider 9 does not engage in continuous sliding with the sharp edge, but with flat and substantially smooth regular surfaces.

Thanks to the above-mentioned right-angled bending of the longitudinal edges 11, 12, the sharp edge of metal sheet is inside the "C" without any substantial contact with parts of the slider 9 and therefore without causing any damage to it.

The slider 9 is advantageously made of plastic material.

The slider 9, at least at its above-mentioned lateral portions 13 is advantageously made of a material with a high friction coefficient.

Figure 3:
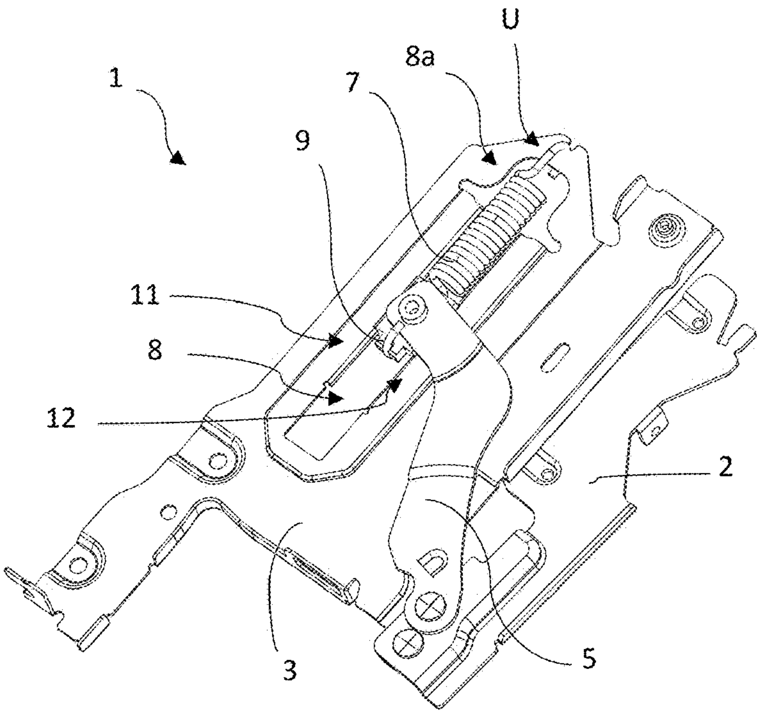
FIGS. 3 and 4 are respective schematic perspective views of a second embodiment of the hinge for electrical household appliances according to the invention in two different configurations of use.
Figure 4:
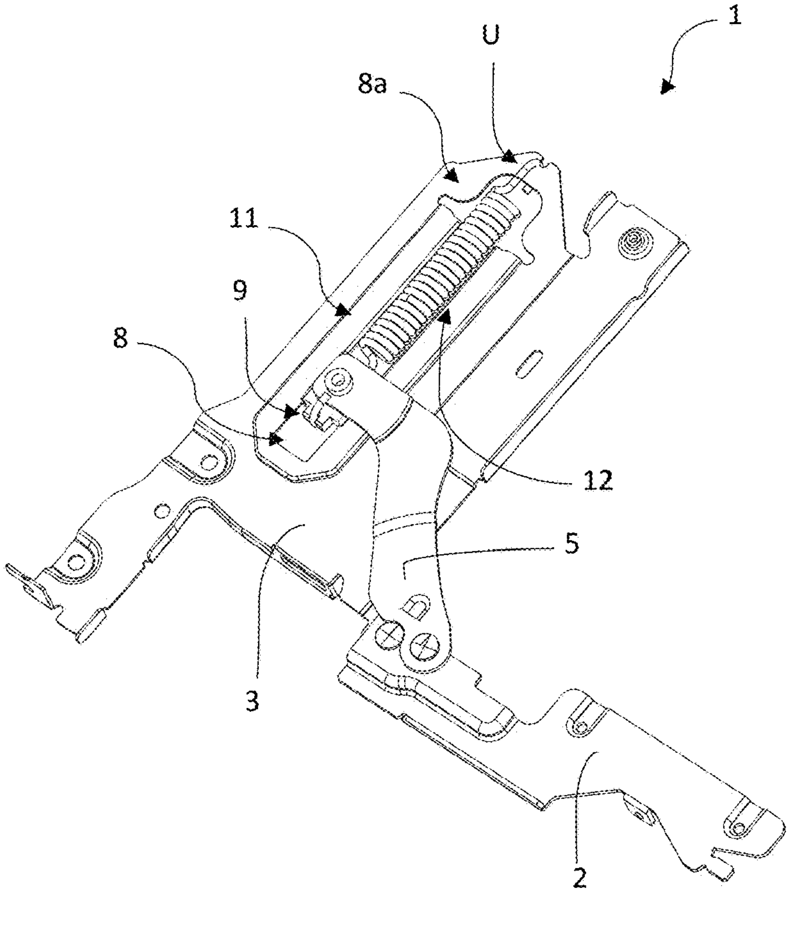

FIGS. 3 and 4 show a second embodiment of the hinge according to the invention, the second embodiment differing basically from that described above with reference to FIGS. 1 and 2 in terms of the elastic element 7 comprising a helical spring acting by traction (rather than by compression) and with a different shape of the upper end 8*a* of the slot 8, specially shaped to allow engagement with an upper end of the helical spring.

In particular, as clearly illustrated in FIGS. 3, 4 and 14, the above-mentioned upper end 8*a* of the slot 8 is advantageously shaped like a bell, so as to allow both easy access for the slider 9 (which must slidably engage on the longitudinal edges 11, 12 of the slot 8), and a stable grip for the hook-shaped U portion of the upper end turn of the helical spring.

A further difference between the second embodiment and the first embodiment of the hinge 1 is due to the absence, in the second embodiment, of the guide fin 10 of the helical spring since, in the case of a helical spring acting by traction it is the traction itself to guarantee the maintaining of the linearity of the spring, there being no risk of bending of the spring.

Figure 5:
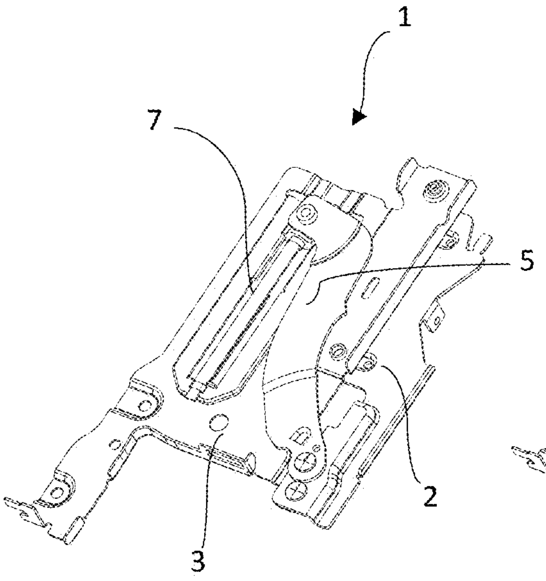
FIGS. 5 and 6 are respective schematic perspective views of a third embodiment of the hinge for electrical household appliances according to the invention in two different configurations of use.
Figure 6:
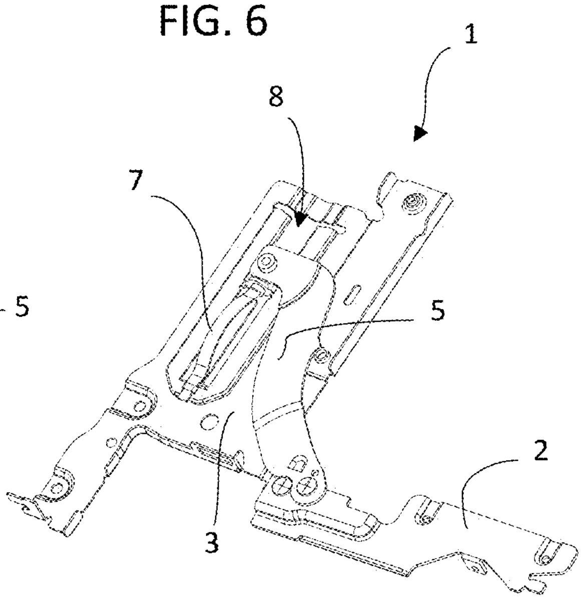

FIGS. 5 and 6 illustrate a third embodiment of the hinge according to the invention.

The third embodiment differs basically from that described above with reference to FIGS. 1 and 2 in that the elastic element 7 consists of a plate spring, the deformation of which occurs by bending of the plate, which is configured to curve emerging relative to a main plane in which the second element 3 lies, as illustrated in FIG. 6.

Figure 7:
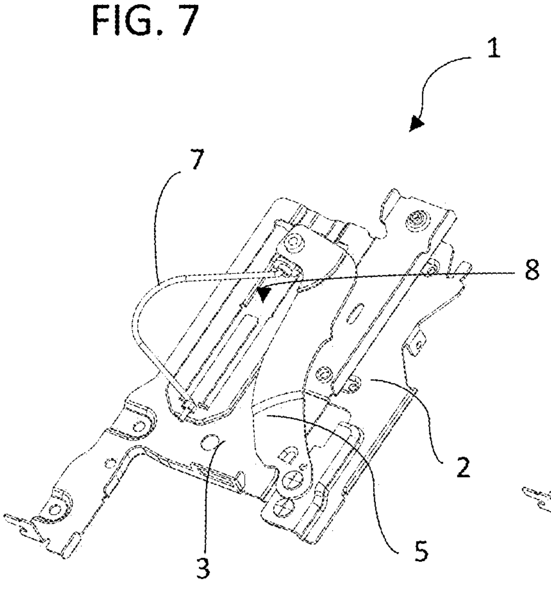
FIGS. 7 and 8 are respective schematic perspective views of a fourth embodiment of the hinge for electrical household appliances according to the invention in two different configurations of use.
Figure 8:
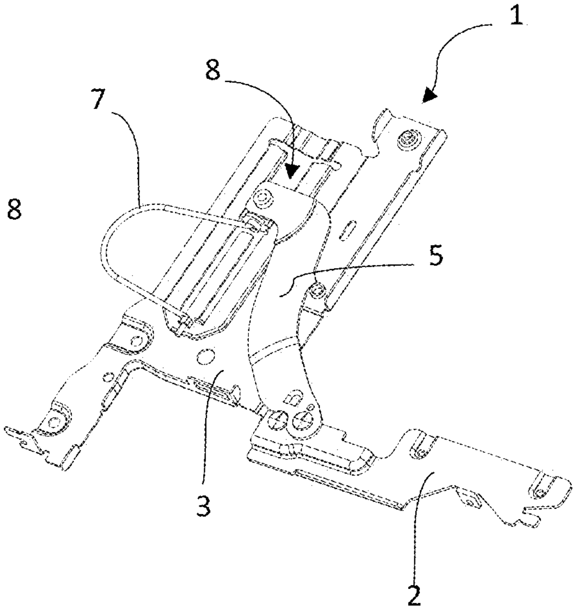

FIGS. 7 and 8 illustrate a fourth embodiment of the hinge according to the invention.

The fourth embodiment differs basically from that described above with reference to FIGS. 1 and 2 in that the elastic element 7 comprises a sort of pin spring the deformation of which occurs by lateral bending. In other words, the spring according to the fourth embodiment is configured for bending whilst keeping on a same plane parallel to the above-mentioned main plane of the second element 3, as illustrated in FIG. 8.

The third and fourth embodiments of the hinge 1 described above are advantageously intended to be used with covers of limited weight since the balancing capacity of the springs used in them generally appears to be less than that of a normal helical spring.

Figure 15:
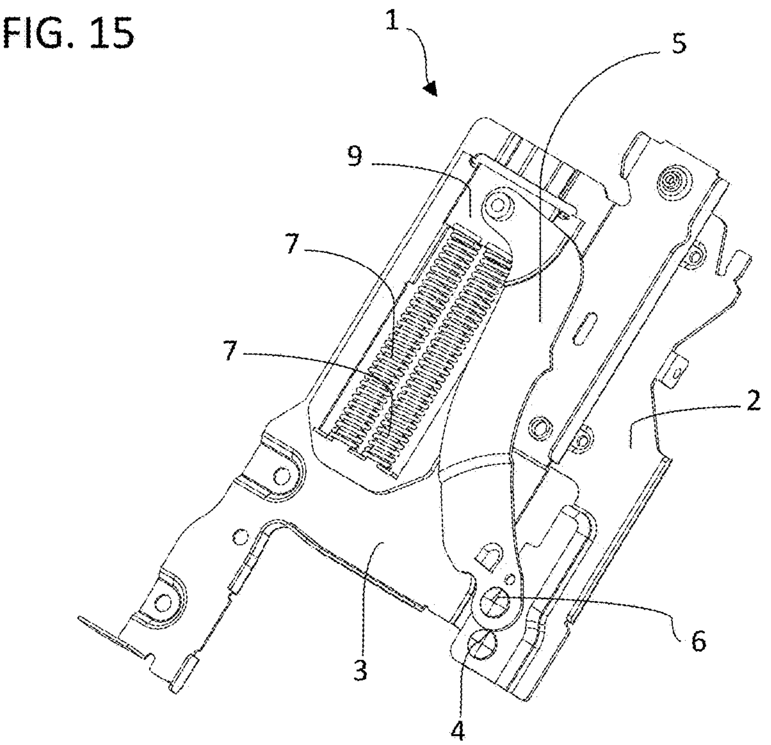
FIGS. 15 and 16 are respective schematic perspective views of a fifth embodiment of the hinge for electrical household appliances according to the invention in two different configurations of use.
Figure 16:
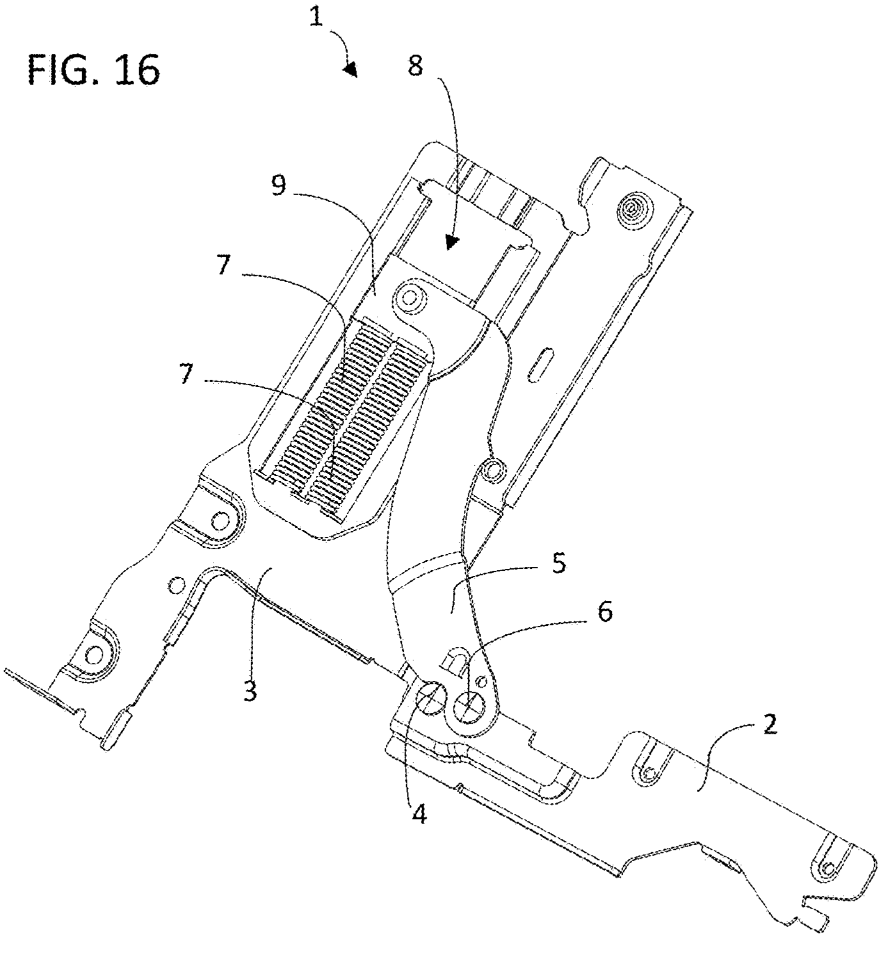
Figure 17:
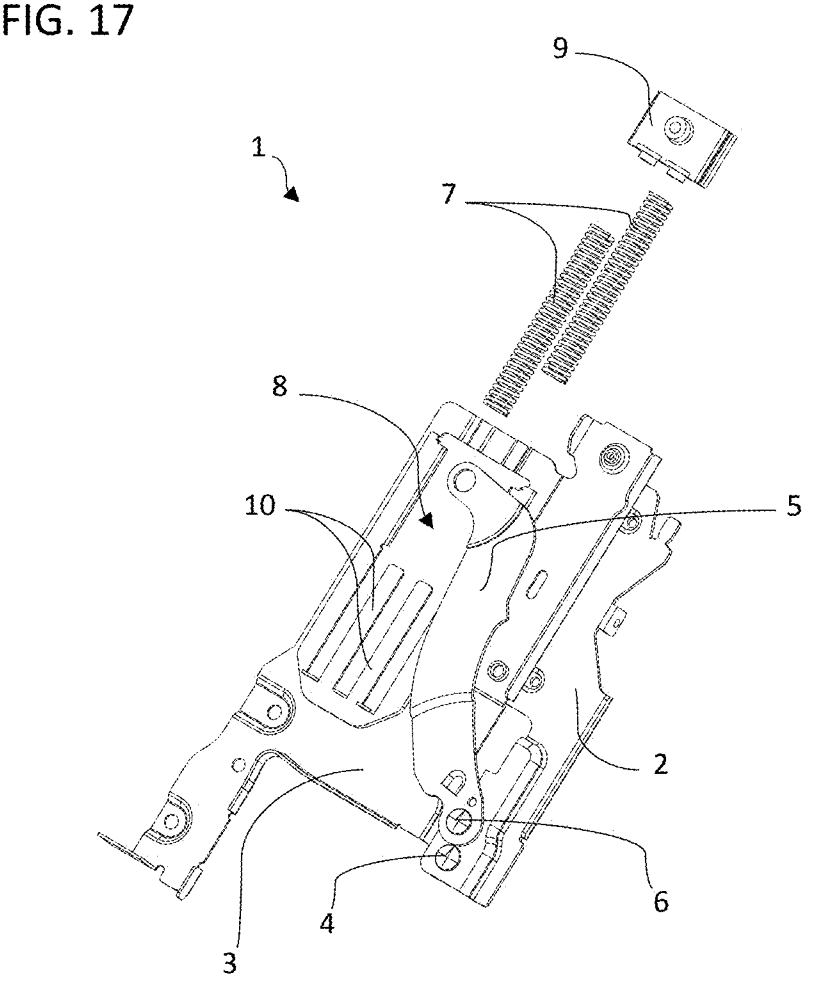
FIG. 17 is a schematic perspective view of the hinge of FIG. 15 partly disassembled.

FIGS. 15 to 17 illustrate a fifth embodiment of the hinge according to the invention.

The fifth embodiment differs basically from that described above with reference to FIGS. 1 and 2 in that it has two elastic elements 7, each consisting of a respective helical spring, with the two elastic elements 7 arranged side by side and parallel to each other.

Two fins 10 are made on the second element 3, emerging inside the slot 8 and extending according to the above-mentioned predetermined direction D1, with each fin 10 designed to be inserted inside a respective helical spring.

The hinge 1 illustrated in FIGS. 15 to 17 comprises a single movable slider 9 which is operatively connected to both the elastic means 7 as well as to the connecting lever 5.

Figure 18:
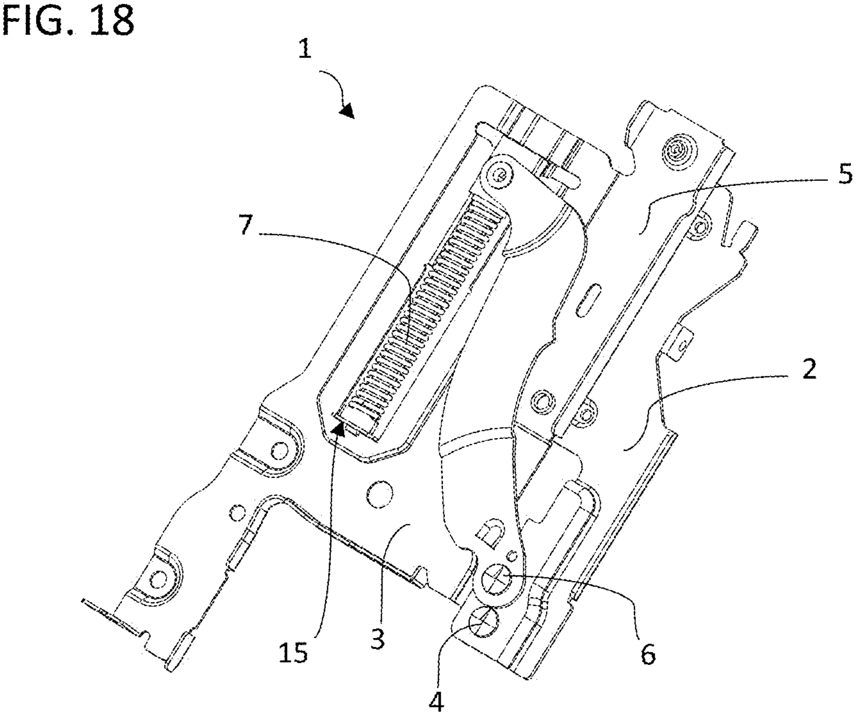
FIGS. 18 and 19 are respective schematic perspective views of a sixth embodiment of the hinge for electrical household appliances according to the invention in two different configurations of use.
Figure 19:
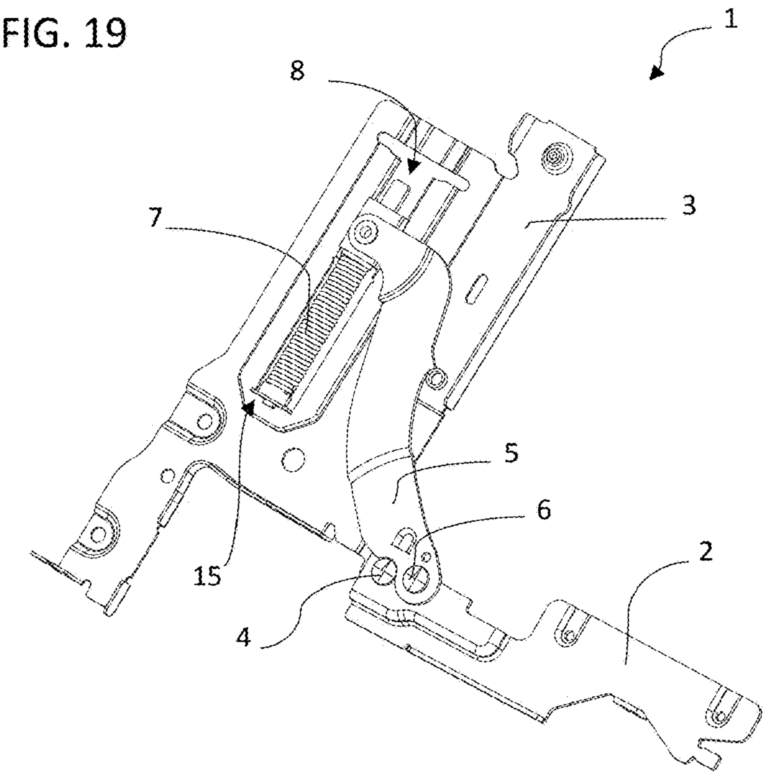
Figure 20:
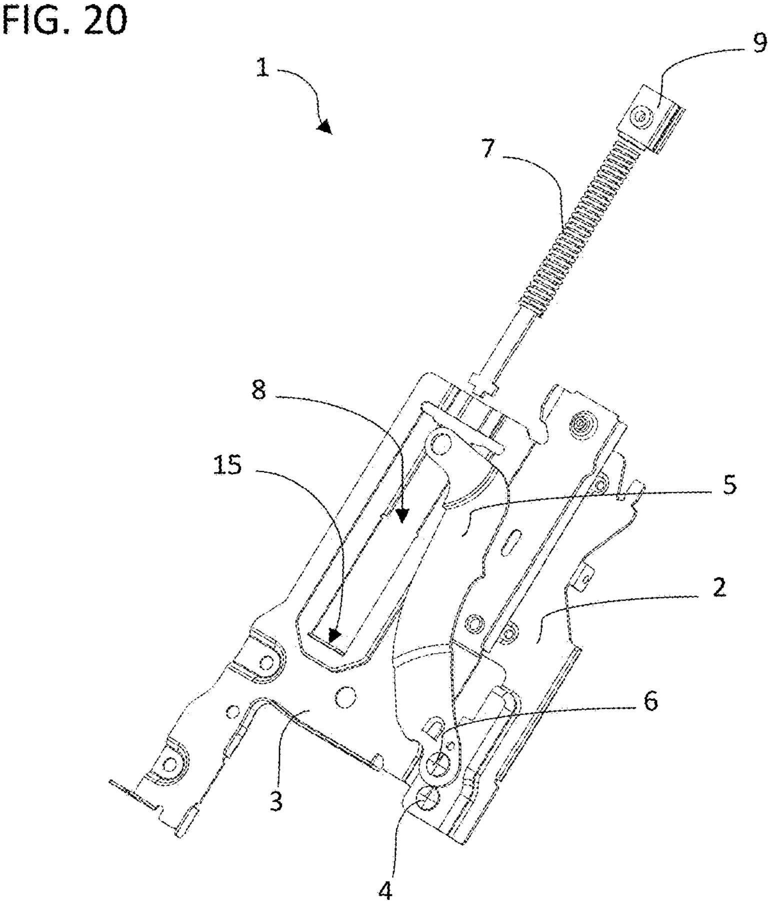
FIG. 20 is a schematic perspective view of the hinge of FIG. 18 partly disassembled.

FIGS. 18 to 20 illustrate a sixth embodiment of the hinge according to the invention.

The sixth embodiment differs basically from that described above with reference to FIGS. 1 and 2 in that the fixed fin 10 is replaced by a removable fin 10'.

The removable fin 10' has a lower end shaped like a cross designed to allow the fin 10' to be engaged in a suitable slot, not visible in the accompanying drawings, made in a bracket 15, indicated in the above-mentioned FIGS. 18 to 20, made by bending the sheet close to a bottom end of the slot 8.

Figure 21:
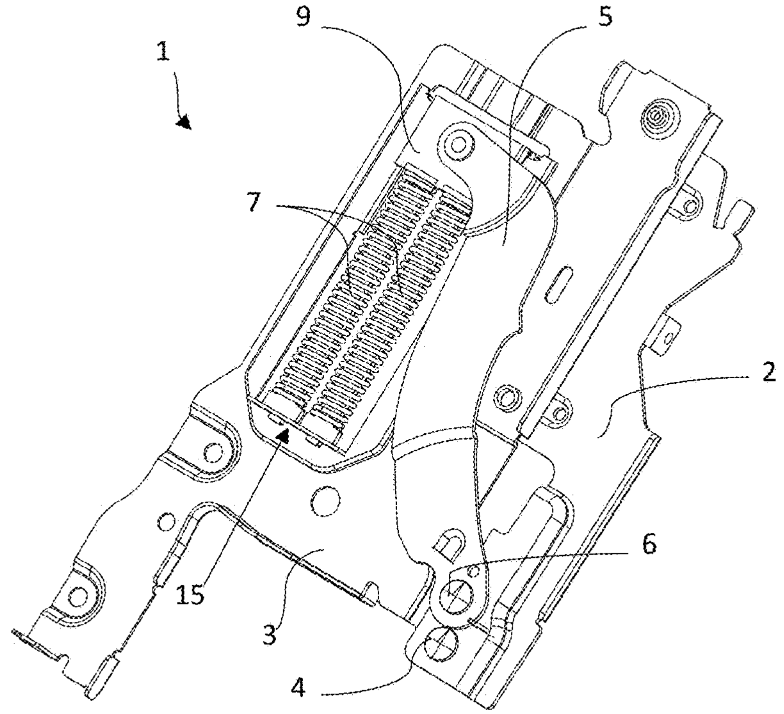
FIGS. 21 and 22 are respective schematic perspective views of a seventh embodiment of the hinge for electrical household appliances according to the invention in two different configurations of use.
Figure 22:
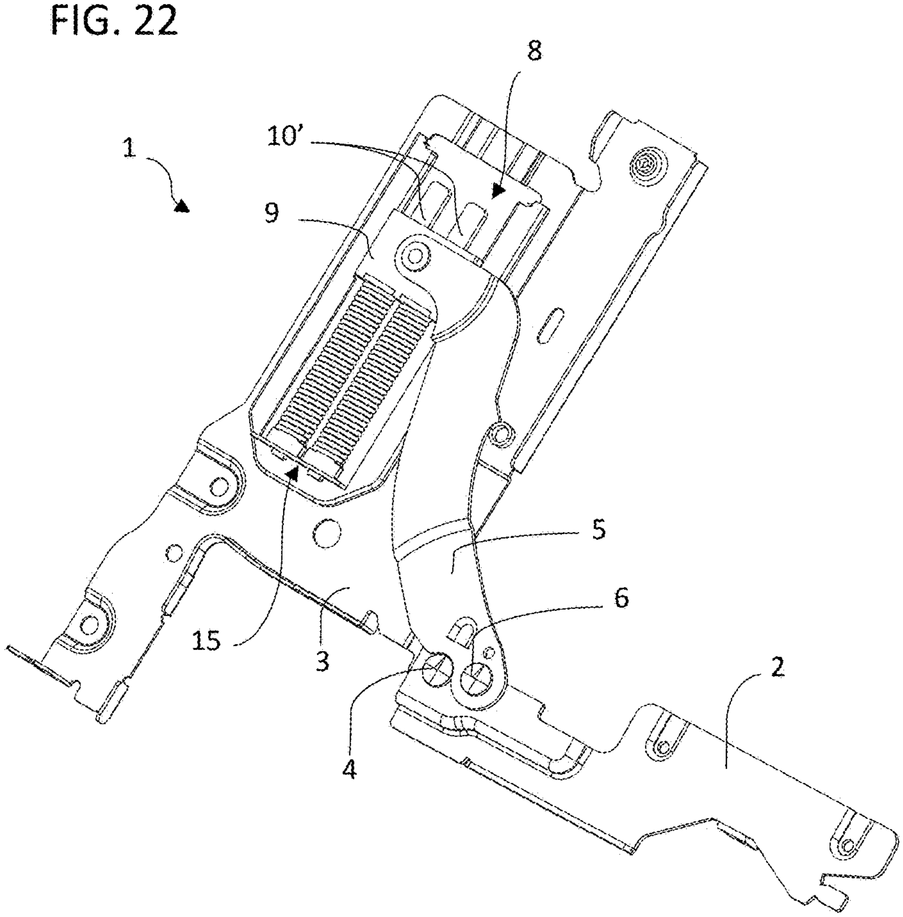
Figure 23:
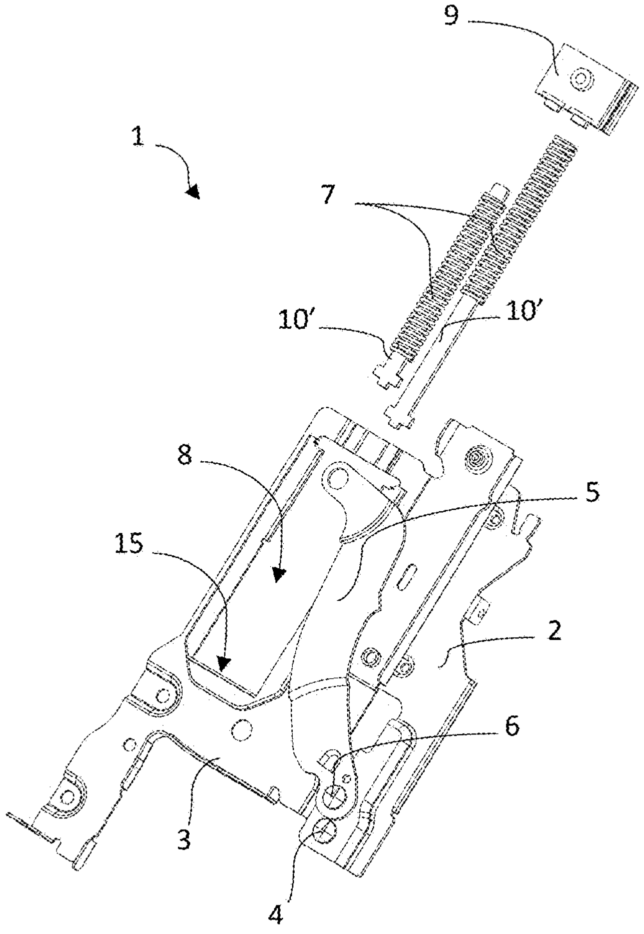
FIG. 23 is a schematic perspective view of the hinge of FIG. 21 partly disassembled.

FIGS. 21 to 23 illustrate a seventh embodiment of the hinge according to the invention.

The seventh embodiment differs basically from that described above with reference to FIGS. 1 and 2 in that it has two elastic means 7 each consisting of a respective helical spring, with the two elastic elements 7 arranged side by side and parallel to each other and with the presence, for each helical spring, of a respective removable fin 10' instead of the fixed fin 10 described above.

On the second element 3 there are therefore two fins 10' emerging inside the slot 8 and extending according to the above-mentioned predetermined direction D1, with each fin 10 designed to be inserted inside a respective helical spring.

Each removable fin 10' has a lower end shaped like a cross designed to allow the fin 10' to be engaged in a suitable slot, not visible in the accompanying drawings, made in a bracket 15, indicated in the above-mentioned FIGS. 21 to 23, made by bending the sheet close to a bottom end of the slot 8.

Figure 24:
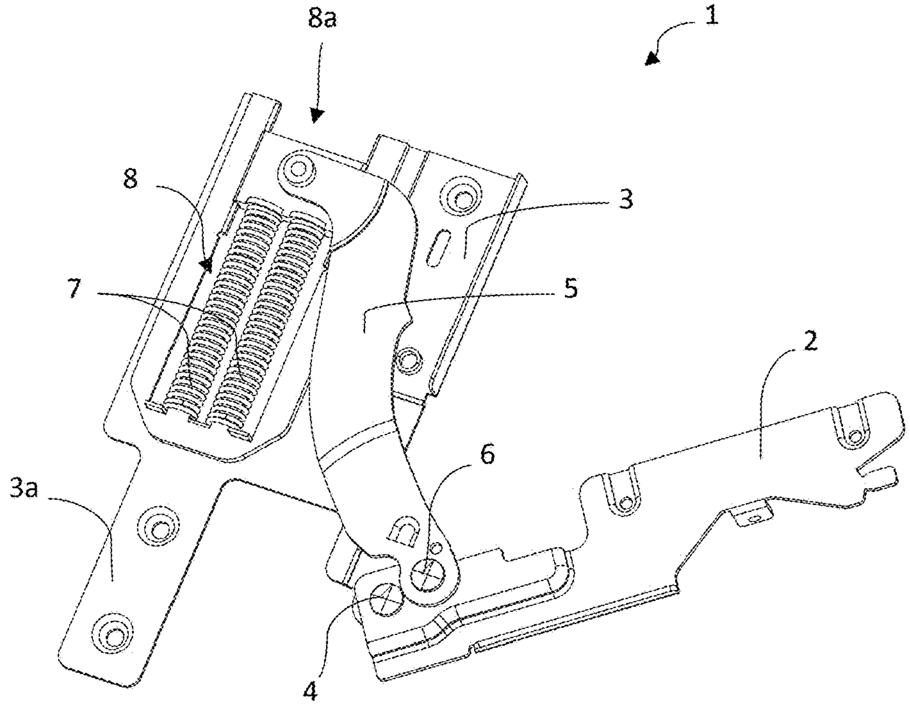
FIG. 24 is a schematic perspective view of an eighth embodiment of the hinge for electrical household appliances according to the invention in a relative configuration of use.

FIG. 24 illustrates an eighth embodiment of the hinge according to the invention.

The eighth embodiment differs basically from that described above with reference to FIGS. 1 and 2 in that it has two elastic elements 7, each consisting of a respective helical spring, with the two elastic elements 7 arranged side by side and parallel to each other.

The eighth embodiment of the hinge 1 illustrated in FIG. 24 differs from all the preceding embodiments in that the slot 8 is open at the top.

In other words, at its upper end 8*a* the slot 8 is free of material, thereby allowing an easy direct insertion of the slider 9.

As illustrated in FIG. 24, the second element 3 has a lower projection 3*a* designed for fixing the hinge 1 to the frame of the electrical household appliance, the lower projection 3*a* extending longitudinally according to the predetermined direction D1 substantially in line with the extension of the slot 8.

Thanks to the fact that the slot 8 is open and free of material at its end 8*a* and to the fact that the lower projection 3*a* extends in line with it, it is possible to mould a second element 3 using the material originally present inside the slot 8 to form the lower projection 3*a* of a second element 3 positioned adjacent to it.

In other words, the punching of the sheet metal of the second element 3 is advantageously optimised, with obvious savings in material, that is to say, without the sheet metal removed from a second element 3 to form the slot 8 constituting a waste, but also constituting a portion (the lower projection 3*a*) of another second element 3.

According to its different embodiments, the hinge 1 according to the invention achieves the preset aims and brings important advantages.

A first advantage linked to the invention is due to the fact that the making of a slot for housing the elastic element in the second element of the hinge allows a reduction in the dimensions relative to the prior art hinges wherein the elastic member is housed outside the second element.

Thanks to the making of the slot, the elastic element is in effect substantially housed centrally with respect to the thickness of the sheet which forms the second element of the hinge, as well as the respective slider, without therefore protruding laterally from it through their entire dimensions, thus contributing to reducing the overall thickness of the hinge.

In other words, making the slot in the form of a gap in material and positioning the elastic element at least partly inside the gap reduces the overall dimensions of the hinge compared with the case in which, in the absence of a gap, the elastic element is positioned on a face of the sheet, wherein, when determining the overall dimensions or thickness of the hinge, it is necessary to add the diameter of the elastic element (in the case of a helical spring) to the thickness of the sheet.

On the other hand, in the hinge according to the invention, thanks to the fact of positioning the elastic element inside the gap defining the slot, the overall dimensions of the hinge are at that point determined only by the diameter of the elastic element since the sheet is inside the relative dimensions.

Another advantage linked to the invention is due to the fact that, for example in the case of use of helical springs acting by compression, the making of the fin allows the number of movable components of the hinge to be reduced; in effect, no spring-guide rod is required. Moreover, the fin is inexpensive to make as it is easily made by moulding simultaneously with the making of the slot.

Yet another advantage linked to the invention is due to the presence of the slider which simultaneously performs many functions: connecting the connecting lever to the elastic element, guiding the movement of the elastic element and friction or damping element.

Another advantage linked to the particular shape of the slider is due to the possibility, during assembly of the hinge, of selecting the preloading of the elastic element simply by positioning the slider in one direction or the other, thereby allowing the range of doors which can be used with a same hinge to be extended.

The invention claimed is:

1. A hinge for a door of an electrical household appliance, comprising:

a first element and a second element pivoted to each other and movable relative to each other in a tilting manner, said first and second elements being fixable one to a frame of an appliance and the other to a door of the appliance, to make the door movable with respect to the frame between a closed position and an open position, said second element being made of sheet metal, a connecting lever connecting said first and second elements, said connecting lever being pivoted on said first element, at least one elastic element operatively connected to said connecting lever to oppose a weight force of the door during opening of the door, the second element comprising a slot for housing said at least one elastic element, and a device for containing and guiding said at least one elastic element configured to guide an extension/compression movement of said at least one elastic element along said slot, said slot being defined by a gap of material in the sheet metal of said second element, wherein said device for containing and guiding comprises a slider movable within said slot and operatively connected both to said at least one elastic element and to said connecting lever;

where said slot extends longitudinally and has two opposite longitudinal edge portions, each of the two opposite longitudinal edge portions including an edge surface and smooth surfaces positioned on both sides of the edge surface, wherein the slider slidably engages with said opposite longitudinal edge portions of the slot, wherein said slider has two respective lateral portions for engaging with the respective opposite longitudinal edge portions, wherein said lateral portions of said slider are C-shaped;

wherein said opposite longitudinal edge portions are folded squarely to slidably engage inside said C-shaped portions of said slider;

wherein the slider engages the smooth surfaces of the opposite longitudinal edge portions and does not engage the edge surfaces.

2. The hinge according to claim 1, wherein said slot has a wide end for inserting said slider along said slot.

3. The hinge according to claim 1, wherein said slider is configured to apply a damping action of the movement of said at least one elastic element by engaging with sliding friction with said opposite longitudinal portions of the slot.

4. The hinge according to claim 1, wherein said opposite longitudinal edge portions face each other with each of the opposite longitudinal edge portions having two opposite faces respectively coplanar with the respective two opposite faces of the other opposite longitudinal edge portion, said lateral portions are configured to slide with friction on the two coplanar faces and cause a damping action of the movement of said at least one elastic element and connecting lever.

5. The hinge according to claim 1, wherein said at least one elastic element includes a helical spring actuated by compression, wherein said device for containing and guiding comprises at least one fin emerging inside said slot and configured to be inserted into said helical spring at a longitudinal end of said helical spring opposite an end of the helical spring operatively connected to said connecting lever.

6. The hinge according to claim 5, wherein said at least one elastic element includes two helical springs placed side by side and said at least one fin includes two fins emerging inside said slot with each of the two fins being configured to be inserted into a respective one of the two helical springs.

7. The hinge according to claim 5, wherein said at least one fin is removable.

8. The hinge according to claim 1, wherein said slider has two longitudinally opposite end portions configured for engaging alternately with said at least one elastic element, and a fulcrum element interposed between said two longitudinally opposite end portions to engage with said connecting lever, said fulcrum element being positioned in an off-center position with respect to said two longitudinally opposite end portions, to provide two different configurations of assembly of the hinge, each of the two different configurations defining a different preload condition of said at least one elastic element.

9. A hinge for a door of an electrical household appliance, comprising:

a first element and a second element pivoted to each other and movable relative to each other in a tilting manner, said first and second elements being fixable one to a frame of an appliance and the other to a door of the appliance, to make the door movable with respect to the frame between a closed position and an open position, said second element being made of sheet metal, a connecting lever connecting said first and second elements, said connecting lever being pivoted on said first element, at least one elastic element operatively connected to said connecting lever to oppose a weight force of the door during opening of the door, the second element comprising a slot for housing said at least one elastic element, and a device for containing and guiding said at least one elastic element configured to guide an extension/compression movement of said at least one elastic element along said slot, said slot being defined by a gap of material in the sheet metal of said second element, wherein said device for containing and guiding comprises a slider movable within said slot and operatively connected both to said at least one elastic element and to said connecting lever, wherein said slider has two longitudinally opposite end portions configured for engaging alternately with said at least one elastic element, and a fulcrum element interposed between said two longitudinally opposite end portions to engage with said connecting lever, said fulcrum element being positioned in an off-center position with respect to said two longitudinally opposite end portions, to provide two different configurations of assembly of the hinge, each of the two different configurations defining a different preload condition of said at least one elastic element.

* * * * *